H. H. MENSENDICK.
SYSTEM OF AWARDING ARTICLES OF MANUFACTURE AS PRIZES.
APPLICATION FILED SEPT. 10, 1917.
1,273,509.
Patented July 23, 1918.
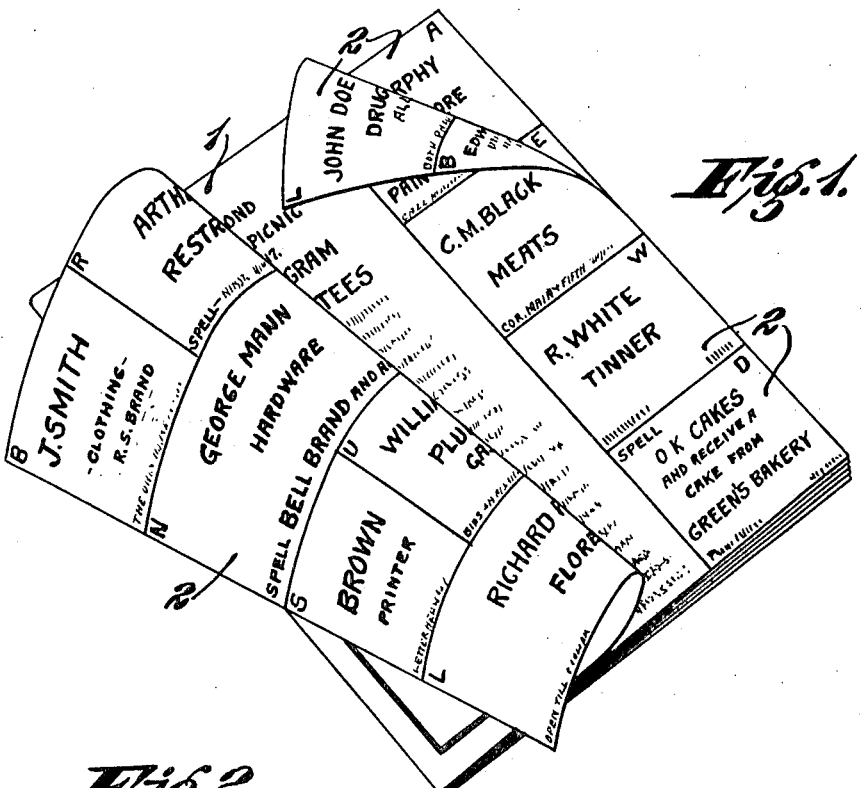

UNITED STATES PATENT OFFICE.

HERMAN H. MENSENDICK, OF ST. LOUIS, MISSOURI.

SYSTEM OF AWARDING ARTICLES OF MANUFACTURE AS PRIZES.

1,273,509.     Specification of Letters Patent.     Patented July 23, 1918.

Application filed September 10, 1917. Serial No. 190,681.

*To all whom it may concern:*

Be it known that I, HERMAN H. MENSENDICK, a citizen of the United States, and a resident of the city of St. Louis and State of Missouri, have invented a new and useful System of Awarding Articles of Manufacture as Prizes, of which the following is a specification.

This invention relates to a system of awarding articles of manufacture as prizes, and has for its object to render such a system more economical and effective as a means for advertising such articles.

The invention consists in providing a number of groups of booklets, comprising a series of advertising cards, each card bearing a letter of the alphabet in a specified place, the name of a predetermined article of manufacture being spelled by a plurality of these letters, and in providing an index for quickly ascertaining the names spelled by the letters in a given booklet.

In the drawings, Figure 1 is a view showing a portion of one of these booklets; and Fig. 2 is a view showing the index or key for ascertaining the word spelled by the letters in the booklet.

Each booklet 1 comprises a number of advertising cards 2. Each of the advertising cards 2 bears a letter of the alphabet in a specified place. The letter preferably appears in the same relative position in each advertising card. The name of one of the advertised articles of manufacture is spelled by a plurality of these letters. The name of no other advertised article can be spelled by any combination of these letters.

The booklets are printed in groups, the letters in the advertising cards of each group spelling the name of a different advertised article. The advertising cards are preferably the same in each group of booklets. Certain of the letters are fixed, that is, they appear in the same cards in each group of booklets. Other letters are variable, that is, they appear in different cards and do not appear in all of the groups of booklets. Some letters of each class are necessary to spell the name of the article. The variable letters determine the word spelled by each booklet. Some of said variable letters are key letters, that is, their location in a particular card indicates the name spelled by the booklet.

The index or key 3, comprises the names of the several kinds of articles to be distributed, arranged in a column. Opposite the name of each kind of article is one of the variable letters in a column headed by a name indicating one of the advertising cards. The name of each article is spelled by the letters in that booklet in which the variable letter opposite the name of that article appears in the advertising card indicated at the top of the column in which the variable letter is located. Numbers may be used instead of the variable letters.

The operation of my system is as follows:

As many groups of booklets are printed as there are kinds of articles to be distributed. There are as many booklets in each group as there are articles to be distributed of the kind whose name is spelled by the letters in that group of booklets. These booklets are distributed in any suitable manner. The holder of a booklet endeavors to spell the name of one of the advertised articles by using the letters in the advertising cards. The holder of a booklet is given the article whose name is spelled by the letters in his booklet, when he ascertains the name of the article. By referring to the index, the distributer of the articles can quickly ascertain the name spelled by the letters in any booklet presented to him. For example, in the booklet shown in the drawings, the Mann advertisement has the letter "N" in the corner, indicating that the words "Bell brand" can be spelled by using a plurality of the letters in the booklet.

The chief advantage of this system is that in order to obtain a given article of manufacture, it is necessary for the holder of a booklet to become familiar not only with the name of that particular article but also with the names of a number of other articles. It is thus possible to economize in the number of articles distributed. The system may be used by a group of persons, or by a single person, to advertise a number of articles.

The letters in the advertising cards have been described as spelling the names of articles of manufacture, but obviously they may be made to spell any words desired, as for instance, the names of persons. The cards may be printed on separate sheets of paper instead of being printed on the pages of a booklet, and other changes may be made without departing from the invention.

I claim:

1. A system for awarding prizes comprising a multiplicity of advertising cards, each bearing a letter of the alphabet, the letters on some of said cards being fixed, and the letters on other cards being variable, fixed and variable letters being necessary to spell the name of some article advertised, and the variations being such that no two names of advertised articles can be spelled with the same letters.

2. A system for awarding prizes comprising a multiplicity of advertising cards, each bearing a letter of the alphabet, the letters on some of said cards being fixed, and the letters on other cards being variable, fixed and variable letters being necessary to spell the name of some article advertised, the variations being such that no two names of advertised articles can be spelled with the same letters, and an index for said system, said index comprising a list of the articles advertised arranged in a column, and a list of the variable letters, said variable letters being arranged opposite the respective article names in the column under headings indicating the particular cards.

3. A system for awarding prizes which comprises a series of groups of advertising cards, each card bearing a letter of the alphabet, and a plurality of the letters in each group of cards spelling the name of an advertised article, the name spelled by each group of cards being different from that spelled by any other group of the series, the name spelled by each group being determined by the location of certain variable letters in specified places, together with an index to said system, said index comprising said variable letters and their different locations, whereby the word spelled by each group can be ascertained.

4. A system for awarding prizes, comprising booklets, the pages of said booklets having letters of the alphabet in specified places, the letters in each booklet spelling the name of an article, the name being determined by the location of certain key letters in specified places, together with an index for ascertaining the word spelled by the letters in each booklet, said index comprising a list of the articles whose names are spelled arranged in a column, together with a list of said key letters, said key letters being arranged opposite said article names under headings indicating the locations of said key letters.

5. An index for the system described comprising a list of advertised articles arranged in a column, and variable letters arranged opposite the names of said advertised articles, said variable letters being arranged in columns under headings indicating the locations of said variable letters.

6. A system for awarding prizes comprising a multiplicity of groups of advertising cards, each bearing a letter of the alphabet, some of said letters being fixed and some being variable, a plurality of the letters of each group spelling the name of one of the advertised articles, the name of no other advertised article being spelled by any possible combination of said letters, and an index to said system, whereby the name spelled by the letters of each group can be ascertained.

Signed at St. Louis, Missouri, this 7th day of September, 1917.

HERMAN H. MENSENDICK.